Jan. 14, 1958  G. O. CROWTHER  2,820,179
VOLTAGE STABILISER CIRCUIT ARRANGEMENT
Filed Feb. 23, 1954

INVENTOR
GERALD OFFLEY CROWTHER

BY *Fred M Vogel*

AGENT

2,820,179
Patented Jan. 14, 1958

2,820,179
VOLTAGE STABILISER CIRCUIT ARRANGEMENT

Gerald Offley Crowther, New Malden, England, assignor, by mesne assignments, to North American Philips Company, Inc., New York, N. Y., a corporation of Delaware Application February 23, 1954, Serial No. 412,010

Claims priority, application Great Britain May 8, 1953

3 Claims. (Cl. 315—230)

The present invention relates to a voltage stabilizer circuit arrangement. More particularly, the invention relates to voltage stabilizer circuit arrangements which produce a stabilized substantially D. C. voltage output with varying loads and input voltages. Such circuit arrangements may be used for example for supplying cathode ray tubes, Geiger-Muller counters and the like.

The object of the invention is to provide an improved stabilizer circuit arrangement in which the power consumed in the stabilizer circuit may be relatively low. Stabilizer circuit arrangements of a like nature are also described and claimed in copending applications Serial No. 412,777, filed February 26, 1954, and Serial No. 412,778, filed Feburary 26 1954.

According to the invention, a voltage stabilizer cicuit arrangement comprises a reservoir capacitor connected across the output terminals of the circuit arrangement which is to be charged through a series resistor, a cold cathode trigger-controlled gas discharge tube, the series combination of a second resistor and said tube being connected in parallel with said reservoir capacitor, a second capacitor being connected substantially between the anode and cathode of said tube and means provided for connection of a voltage reference source between the trigger electrode of said tube and the positive charged terminal of the reservoir capacitor.

The circuit arrangement may utilize a voltage reference source which comprises a second cold cathode trigger-controlled gas discharge tube.

Figure 1:
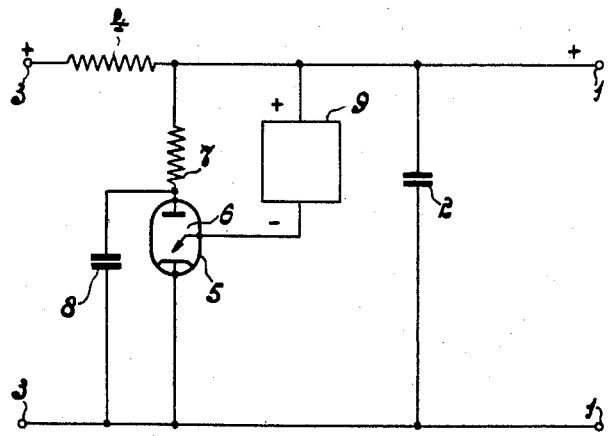
Figure 2:
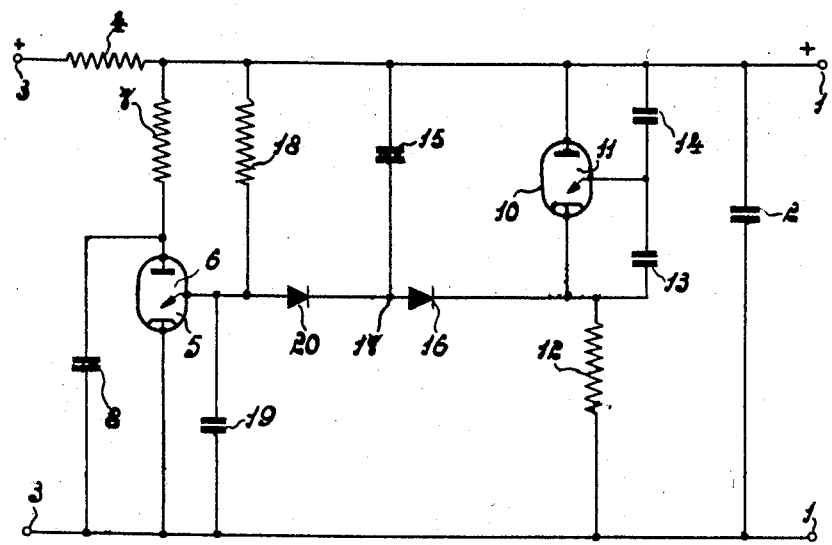

In order that the invention may be more readily carried into effect, reference will now be made, by way of example, to the accompanying drawing in which:

Fig. 1 is a schematic diagram of a preferred embodiment of the voltage stabilizer circuit arrangement of the present invention; and Fig. 2 is a schematic diagram, in greater detail, of the voltage stabilizer circuit arrangement of Fig. 1.

Referring to Figure 1, output terminals 1, 1, across which the stabilized voltage appears, are connected across a reservoir capacitor 2. An unstabilized voltage is applied at input terminals 3, 3. Connected between the positive one of the input terminals 3 and the positive one of the output terminals 1, is connected a resistor 4. In some instances the resistor 4 may be the internal resistance of the unstabilized voltage source. Across the capacitor 2 is connected a cold cathode trigger controlled gas discharge tube 5, together with its anode load comprising resistor 7. Between the anode and cathode of tube 5 is connected a capacitor 8. Between the positive output voltage terminal and the trigger electrode 6 of tube 5 is connected a voltage reference source 9. The voltage reference source 9 may comprise a battery or a circuit arrangement providing a stable reference voltage.

When the unstabilized voltage is applied to terminals 3, 3, the reservoir capacitor 2 charges through resistor 4 and the voltage across capacitor 2 and across a load connected to terminals 1, 1 rises. Capacitor 8 also charges via resistor 7 to substantially the voltage across capacitor 2, since the time constant of resistor 7 and capacitor 8 is short relative to the time constant of resistor 4 and capacitor 2.

The rise in voltage across capacitor 2 is applied to the trigger electrode 6 via the voltage reference source 9 and when the voltage across capacitor 2 reaches a certain value determined by the voltage reference source and the trigger ignition voltage, the trigger 6 ignites the tube 5 and thereby capacitor 8 is discharged to the anode extinction voltage of tube 5 and then tube 5 extinguishes.

In recharging capacitor 8 charge is taken from capacitor 2 and the voltage across capacitor 2 is decreased due to the removal of a fixed charge. Steadily, capacitor 2 recharges until tube 5 ignites again and so the cycle is repeated.

The stabilized voltage, therefore, has a small ripple voltage of constant amplitude the upper voltage level of which is fixed in an absolute sense by the trigger ignition potential plus the voltage of the voltage reference source 9. Thus the value of the stabilized voltage may be varied between certain limits by varying the voltage of reference voltage source 9. The stabilized voltage will be the average between the upper and lower peaks of the ripple voltage.

When the unstabilized source voltage rises or the load becomes lighter, the capacitor 2 is able to charge relatively faster and thus more energy is drained away, because tube 5 discharges and capacitor 8 recharges more often in a given time interval. When the unstabilized voltage decreases or the load becomes heavier, the capacitor 2 is able to charge relatively slower and thus less energy is drained away, because tube 5 discharges and capacitor 8 recharges less often in a given time interval.

By using a voltage reference source 9, instead of a potential divider, to supply the voltage to the trigger electrode 6, it is possible to apply the whole of the voltage change across capacitor 2, rather than a proportion of it, to the trigger electrode 6 and thereby improved stabilization may be obtained. Similarly, any variation of the trigger ignition potential is not multiplied by a potentiometer ratio in its effect at the output terminals.

In Fig. 2, the voltage reference source 9 of Fig. 1 takes the form of a circuit arrangement comprising a second cold cathode trigger-controlled gas discharge tube. Similar components of Figs. 1 and 2 have the same reference numerals.

A second cold cathode trigger-controlled gas discharge tube 10 is connected in series with resistor 12 and the series connection is connected in parallel with capacitor 2. In parallel with tube 10 is connected the series combination of capacitors 13 and 14 and the trigger electrode 11 of tube 10 is connected to the junction between these capacitors.

Capacitors 13 and 14 are charged through resistor 12, thereby the voltage of the cathode of tube 10 falls and at the same time the voltage of trigger electrode 11 falls proportionally according to the ratio of the impedance of capacitors 13 and 14. When the cathode-trigger electrode voltage reaches the trigger ignition potential, the tube 10 ignites and discharges capacitors 13 and 14 to the anode-cathode extinction voltage. Thus the tube 10 oscillates with constant amplitude and with constant peak values of voltage relative to the anode voltage between cathode and anode. This constant peak voltage charges capacitor 15 via rectifier 16 and thereby holds junction 17 at a constant negative voltage with respect to the positive terminal of the stabilized output voltage.

Trigger electrode 6 of tube 5 is connected via a resistor 18 to the positive output terminal 1, via a capacitor 19 to the negative output terminal 1, and via a rectifier 20 to the junction point 17.

Trigger electrode 6 is encouraged to rise to the full stabilized voltage with respect to the cathode of tube 5 but is prevented from rising above the voltage of junction 17 because of rectifier 20. Thus when the tube 5 is extinguished the trigger electrode follows the voltage of junction 17.

Rectifier 20 also prevents the trigger electrode 6 from becoming an undue load upon the voltage reference circuit when the tube 5 is ignited.

The rise in voltage at the output terminals 1, 1 due to capacitor 2 charging via resistor 4 is applied to the trigger electrode 6 and at a predetermined value tube 5 ignites and discharges capacitor 8. Thereupon capacitor 8 recharges and takes a fixed amount of charge from capacitor 2. Thus stabilization takes place as described with reference to Figure 1.

The stabilized voltage at terminals 1, 1 may be altered by altering the voltage of the voltage reference source. This may be achieved by altering the ratio of capacitor 13 to capacitor 14.

While the invention has been described by means of specific examples and in specific embodiments, I do not wish to be limited thereto, for obvious modifications will occur to those skilled in the art without departing from the spirit and scope of the invention.

What is claimed is:

1. A voltage stabilizer circuit arrangement comprising a pair of output terminals, a reservoir capacitor connected across said output terminals, a first resistor, means connected in series with said resistor for charging said capacitor in accordance with the value of an unstabilized input voltage, a first cold cathode trigger-controlled gas discharge tube having an anode, a cathode, and a trigger electrode, a second resistor connected in series with said tube, the series combination of said tube and said second resistor being connected across said capacitor, a second capacitor connected substantially between the anode and cathode of said tube, said second resistor and said second capacitor periodically blocking said tube in accordance with the value of said unstabilized voltage, and a voltage reference source connected between the trigger electrode of said tube and the positively charged terminal of said reservoir capacitor, said reservoir capacitor and said voltage reference source periodically unblocking said tube in accordance with the value of said unstabilized voltage thereby producing a substantially stabilized output voltage across said output terminals having a value dependent upon the voltage of said voltage reference source.

2. A voltage stabilizer circuit arrangement as set forth in claim 1, wherein the voltage reference source comprises a second cold cathode trigger-controlled gas discharge tube.

3. A voltage stabilizer circuit arrangement as set forth in claim 2, wherein said voltage reference source further comprises said second tube having an anode, a cathode, and a trigger electrode, a third resistor connected in series with said second tube, the series combination of said second tube and third resistor being connected across said reservoir capacitor, a third capacitor connected between the anode and trigger electrode of said second tube, a fourth capacitor connected between the trigger electrode and cathode of said second tube, a fifth capacitor connected between the anode and cathode of said second tube, a first rectifier interposed between the cathode of said second tube and said fifth capacitor to maintain the junction point between said fifth capacitor and said rectifier at a constant negative voltage with respect to the positively charged terminal of said reservoir capacitor, a sixth capacitor connected between the trigger electrode and cathode of said first tube, a fourth resistor connected between the trigger electrode of said first tube and the positively charged terminal of said reservoir capacitor, and a second rectifier connected between the trigger electrode of said first tube and the junction point between said fifth capacitor and said first rectifier to prevent the voltage at the trigger electrode of said first tube from rising above the voltage at the junction point between said fifth capacitor and said first rectifier.

References Cited in the file of this patent

UNITED STATES PATENTS

| | | |
|---|---|---|
| 2,073,247 | Miller | Mar. 9, 1937 |
| 2,097,882 | Hudtwalker | Nov. 2, 1937 |
| 2,186,013 | Edgerton | Jan. 9, 1940 |
| 2,331,317 | Germeshausen | Oct. 13, 1943 |
| 2,459,624 | Collins | Jan. 18, 1949 |

FOREIGN PATENTS

| | | |
|---|---|---|
| 686,092 | Great Britain | Jan. 21, 1953 |